Dec. 29, 1936.  G. H. HUFFERD  2,065,589
BALL BEARING JOINT
Filed Feb. 17, 1933
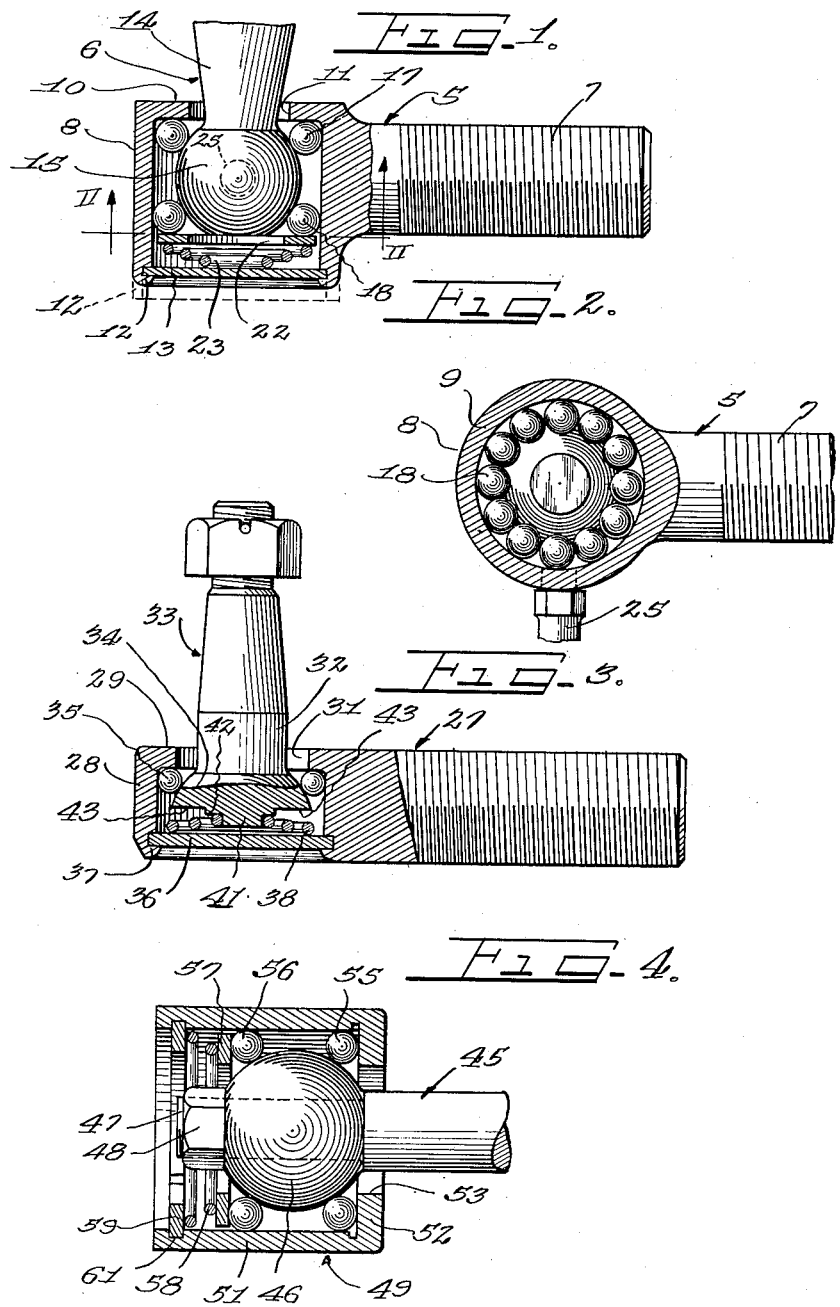
Inventor
George H. Hufferd.
by
Attys.

Patented Dec. 29, 1936

2,065,589

UNITED STATES PATENT OFFICE 2,065,589

BALL BEARING JOINT

George H. Hufferd, Detroit, Mich., assignor to Thompson Products Incorporated, Cleveland, Ohio, a corporation of Ohio Application February 17, 1933, Serial No. 657,180

5 Claims. (Cl. 287—90)

This invention relates to ball bearing joints and will be described as incorporated in a tie rod connection for the steering mechanism of an automotive vehicle.

An object of this invention is the provision of an improved joint of the class identified which is adapted to permit a limited universal movement and which is so designed and constructed that the bearing parts remain constantly in snug engagement.

Another object of this invention is the provision of a tie rod socket or joint which is substantially trouble-proof, being automatically self-adjusting to compensate for wear of the engaging parts and in which the parts are so disposed that lost motion or rattling is effectively prevented.

A further object of this invention is the provision of a simplified construction, economical to manufacture, comprising a ball and socket joint including ball bearings in the socket so disposed with relation to the head of the stud and with the walls of the socket, such that constant contact is maintained between the balls and the relatively moving elements of the joint and means for constantly urging the parts into such a relation that wear is automatically compensated for without the necessity of servicing or manually adjusting the joint.

Other objects and advantages of this invention will become apparent to those skilled in the art, from the following detail description of the accompanying drawing illustrating preferred embodiments of my invention.

On the drawing:

Figure 1 is a longitudinal vertical sectional view through an assembled bearing socket incorporating my invention and illustrating portions thereof in elevation.

Figure 2 is a section taken on substantially the line II—II of Figure 1.

Figure 3 is a sectional view similar to Figure 1, also showing parts in elevation and illustrating one modification of the invention, and Figure 4 is a longitudinal section through another modification of my invention and showing parts in elevation.

As shown on the drawing:

The ball bearing joint illustrated in Figures 1 and 2 includes a socket member 5 and a stud 6 disposed for limited universal movement relative to each other. The socket member 5 includes a threaded connecting portion 7, and a substantially cylindrical socket 8 comprising a cylindrical side wall 9 and a top wall 10 with an opening 11 therein. The lower edge of the side wall 9 is of reduced cross-section forming a depending flange 12 illustrated in dotted lines, which flange is subsequently rolled inwardly for permanently securing in place a closure plate 13, closing the lower side of the socket.

The stud 6 comprises an upwardly extending shank 14 and a downwardly extending ball or head 15 disposed within the socket 8. The head 15 has a larger diameter than that of the opening 11 in the upper side of the socket and positively prevents the socket from falling off the head, under any circumstances.

Two sets of ball bearings 17 and 18 are disposed in engagement with the segmental cylindrical head 15 and in engagement with the socket 8. The set of balls 17 snugly engages the upper wall 10 and the cylindrical wall 9 by being maintained in the corner formed by the two walls. The balls 17 are also disposed substantially diametrically opposite balls of the set 18 and each set is disposed on one side of a plane passing through a great circle of the head 15, opposite to the other set of balls. The set of balls 18 is maintained in constant engagement with the inner surface of the wall 9 of the socket and with the cylindrical surface of the head 15 by a retaining ring 22 urged upwardly against the balls 18 by a coiled spring 23 held under compression by the closure 13.

By this arrangement it will be appreciated that should the parts 8 and 15 become worn, the balls 17 and 18 will be maintained constantly in engagement with the relatively moving elements of the joint to automatically compensate for wear and obviate the necessity of service or manual adjustment of the parts. In order to facilitate lubrication of the joint, I preferably provide a suitable grease cup 25, through which grease may be injected into the joint. The opening 11 in the wall 10 is of larger diameter than the shank or extension 14, to make possible the assembly of the parts and to provide for limited angular movement of the shank 14 within the opening 11.

The construction shown in Figure 3 comprises a socket member 27 including a substantially cylindrical socket 28. The socket 28 is provided with a top wall 29 having an opening 31 therethrough of larger diameter than the shank 32 of the stud 33, but of smaller diameter than the segmental spherical head 34 on the stud 33. Within the socket 28 is disposed a set of ball bearings 35 engaging the inner surface of the walls of the socket and engaging the segmental spherical surface of the head 34, to provide a bearing therefor and to permit limited universal movement between the parts 27 and 33.

A closure plate 36 is disposed adjacent the lower side of the socket 28 to close the same, and is permanently secured in position by an inwardly extending flange 37. A coiled spring 38 is seated upon the closure plate 36 and is held under compression between the closure plate and the head of the stud 33, for constantly urging upwardly on the head and holding it in constant engagement with the set of balls 35 throughout the range of relative movement of the elements of the joint. The lower side of the head is provided with a cylindrical lug 41 disposed within the upper coil of the spring 38, which coil engages an annular shoulder 42 disposed about the base of the lug 41. The lower face of the head is cut away toward the outer edge as indicated at 43 to provide sufficient clearance, for oscillation of the stud 33 relative to the socket member 27.

In the modification of the invention illustrated in Figure 4, a stud 45 is provided with a ball head 46 removably secured thereto. The head 46 has an opening therethrough and is fitted on a reduced end portion 47 of the shank 45 and is tightly held in place by a nut 48 threaded on the reduced end portion 47. The socket member 49 defines a cylindrical socket formed by a side wall 51 and an end wall 52 having an opening 53 therethrough to permit limited universal movement of the stud 45 relative to the socket member 49. The term "stud" used as designating the element 45, is intended to include relatively long members such as a tie rod, shaft, or the like if desired.

In this construction two sets of balls 55 and 56 are disposed in engagement with the head 46 and with the walls of the socket member 49 in a manner substantially identical to that illustrated in Figures 1 and 2. A retaining ring 57 is held against the balls 56 by a compression spring 58, confined between the ring 57 and a ring 59 seated in a groove 61 in the wall 51.

This construction is particularly suited for use when it is desired to have the stud or rod 45 readily removable from the socket. In order to remove the stud 45, it is only necessary to first release the nut 48 and withdraw the portion 47 from the head 46. In order to remove the head 46 from the socket, it is necessary to first remove the ring 59 and the associated parts which serve to urge the head constantly against the balls 55.

From the foregoing specification it will be understood, by those skilled in the art, that this invention is susceptible of various forms and modifications without departing from the principle thereof and I desire, therefore, that the patent to be granted hereon shall not be restricted in any manner except as necessitated by the prior art.

I claim as my invention:

1. A ball joint comprising a socket member having a cylindrical socket with an inturned annular flange at one end thereof defining a restricted opening, a stud including a segmental spherical head disposed within said socket and of larger diameter than the opening, and a shank freely extending through said opening, ball bearings at said flanged end between said head and cylindrical wall of said socket, other ball bearings on the opposite side of said head, a washer having a flat top slidable within said socket in contact with the bottoms only of said last-mentioned ball bearings, a closure for the other end of said socket, a spring positioned under compression between said washer and said closure for constantly urging said head, ball bearings and cooperating socket walls into bearing relationship.

2. A joint comprising a socket member having a cylindrical socket provided at one end with an inturned annular flange, a closure fixed in the other end of said socket, a headed member freely extending through the flanged end of said socket and having a segmental spherical head within said socket, said head having a cylindrical extension oppositely disposed from the extended end thereof and aligned therewith, ball bearings confined between said head and said flange and a coiled spring positioned under compression between said head and closure and encircling said cylindrical extenison to bear directly against said head.

3. In a ball bearing joint, a cylindrical outer race member including an inwardly extending annular flange at one end, a stud including a head forming a segmental spherical inner race, balls disposed between said inner and outer races in a plane non-coincident with a great circle of said inner race and contacting with said annular flange, said inner race being adapted for rotation about a center line thereof, other than one perpendicular to a plane passing through the centers of said balls, said stud including a centrally disposed depending lug and resilient means fitted over the end of said lug and confined within the outer race member for retaining said balls and said races in constant engagement and for urging said stud toward a central position when displaced beyond a predetermined angular position.

4. In a joint, a socket having a cylindrical inner wall and an end wall defining a restricted opening, a stud projecting through said restricted opening, a member embodying a spherical surface on the stud and positioned in the socket, balls interposed between the spherical member and the end wall, an end portion extending from the bottom of said stud in said socket and resilient means fitted around said end portion and confined within said socket for retaining said stud in operative position.

5. A joint comprising a socket including side walls and an end wall, a stud projecting freely through the end wall and universally movable relative to the socket, a member embodying a spherical surface on the stud positioned within the socket, balls interposed between the spherical member and the end wall having three point contact with the spherical member, the end wall and the side walls respectively, an end portion on the stud extending axially below the spherical portion and spring means disposed around said end portion and held under compression within the socket to maintain the spherical surface in contact with the balls.

GEORGE H. HUFFERD.